(12) United States Patent
Langford et al.

(10) Patent No.: US 8,866,318 B2
(45) Date of Patent: Oct. 21, 2014

(54) METHOD FOR CONTROLLING THE GENERATION OF ELECTRICITY APPLIED TO AN AIRCRAFT GAS TURBINE, AND DEVICE IMPLEMENTING SUCH A METHOD

(75) Inventors: Stephen Langford, Pau (FR); Pierre Harriet, Billere (FR)

(73) Assignee: Turbomeca, Bordes (FR)

( * ) Notice: Subject to any disclaimer, the term of this patent is extended or adjusted under 35 U.S.C. 154(b) by 0 days.

(21) Appl. No.: 13/884,822

(22) PCT Filed: Dec. 12, 2011

(86) PCT No.: PCT/FR2011/052935
§ 371 (c)(1),
(2), (4) Date: May 10, 2013

(87) PCT Pub. No.: WO2012/080633
PCT Pub. Date: Jun. 21, 2012

(65) Prior Publication Data
US 2013/0234506 A1  Sep. 12, 2013

(30) Foreign Application Priority Data

Dec. 13, 2010 (FR) .................................... 10 60419

(51) Int. Cl.
| | | |
|---|---|---|
| *F01D 15/10* | (2006.01) | |
| *F02C 7/275* | (2006.01) | |
| *B60R 16/03* | (2006.01) | |
| *F02C 3/10* | (2006.01) | |
| *F02C 7/32* | (2006.01) | |
| *F02C 7/26* | (2006.01) | |

(52) U.S. Cl.
CPC ................ *B60R 16/03* (2013.01); *F02C 7/275* (2013.01); *F01D 15/10* (2013.01); *F05D 2270/101* (2013.01); *F02C 3/10* (2013.01); *F05D 2260/85* (2013.01); *F05D 2220/76* (2013.01); *F02C 7/32* (2013.01); *F05D 2220/329* (2013.01); *F02C 7/26* (2013.01)
USPC ......................................................... 290/1 A

(58) Field of Classification Search
CPC ........................................................ F01D 15/10
USPC ............................................................ 290/1 A
See application file for complete search history.

(56) References Cited

U.S. PATENT DOCUMENTS 6,107,775 A * 8/2000 Rice et al. ...................... 318/811
7,555,893 B2 * 7/2009 Okai et al. ...................... 60/228
(Continued)

FOREIGN PATENT DOCUMENTS

| EP | 0 274 951 | 7/1988 |
|---|---|---|
| EP | 1 712 761 | 10/2006 |

(Continued)

OTHER PUBLICATIONS

International Search Report Issued Feb. 22, 2012 in PCT/FR11/52935 Filed Dec. 12, 2011.

*Primary Examiner* — Joseph Waks
(74) *Attorney, Agent, or Firm* — Oblon, Spivak, McClelland, Maier & Neustadt, L.L.P.

(57) ABSTRACT

A method improving acceleration efficiency of a gas generator of a gas turbine by reducing take-up of electric power, during transition phases, to conserve a sufficiently large surge margin for an operating line. The method increases acceleration/deceleration power of the gas generator by adjusting voltage of an electric network onboard the aircraft. After a phase of starting the gas turbine, voltage of the onboard network is adjusted by a voltage set value controlled by determining unballasting/ballasting status of a main electricity generation source of the onboard network. The status-determining is executed according to demand for taking power to be supplied for propulsion of the aircraft. The status-determining is followed by selecting a voltage set value from plural levels according to the determining the unballasting/ballasting status, and applying the selected set value to a control loop of the voltage supplied to the onboard network.

12 Claims, 3 Drawing Sheets

(56) References Cited

U.S. PATENT DOCUMENTS

| | | | |
|---|---|---|---|
| 7,663,264 B2* | 2/2010 | Dubois et al. | 307/9.1 |
| 7,869,234 B2* | 1/2011 | Kazlauskas | 363/44 |
| 8,378,510 B2* | 2/2013 | Tanaka et al. | 290/31 |
| 2006/0225431 A1 | 10/2006 | Kupratis | |
| 2007/0257558 A1 | 11/2007 | Berenger | |
| 2010/0058731 A1 | 3/2010 | Haehner et al. | |
| 2011/0049891 A1 | 3/2011 | Bedrine et al. | |
| 2013/0134916 A1* | 5/2013 | Schult et al. | 318/400.23 |
| 2013/0154357 A1* | 6/2013 | Schult et al. | 307/9.1 |
| 2014/0008972 A1* | 1/2014 | De Wergifosse et al. | 307/9.1 |

FOREIGN PATENT DOCUMENTS

| | | |
|---|---|---|
| EP | 1 852 953 | 11/2007 |
| FR | 2 914 697 | 10/2008 |
| FR | 2 929 324 | 10/2009 |

* cited by examiner

METHOD FOR CONTROLLING THE GENERATION OF ELECTRICITY APPLIED TO AN AIRCRAFT GAS TURBINE, AND DEVICE IMPLEMENTING SUCH A METHOD

TECHNICAL FIELD

The invention relates to a method for controlling the electrical generation applied to an aircraft gas turbine, more particularly in its transient phases of acceleration and deceleration. The invention applies, in particular, to a helicopter turboshaft engine capable of implementing such a method.

The invention relates to the field of gas turbines, in particular turboshaft engines, turbojet engines or turboprops of aircrafts (helicopters, airplanes, other flying machines).

An aircraft engine typically comprises a compressor-combustion chamber-turbine assembly forming a gas generator. In this gas generator, the fresh air is compressed by the rotation of the compressor and brought into the chamber where it is mixed with the fuel; then, after combustion, the hot gases are evacuated with a high kinetic energy and expanded into the turbine which extracts the rotary energy for driving the compressor via a high-pressure drive shaft (HP in an abbreviated form) or HP body. The excess of kinetic energy provides the energy for moving the aircraft, either directly for airplanes, through an exhaust nozzle, or indirectly for helicopters, via a new expansion into a free turbine linked to a drive shaft (downstream, through-going or via a shaft outside the gas generator).

STATE OF THE ART

In the case of a helicopter turboshaft engine, a great part of the mechanical energy delivered by this drive shaft is supplied to the rotor drive mechanism and to the consumers (hydraulic pump, electrical equipments, air conditioning, rotor brake, etc.) via speed-reducing gearings or, more rationally, via an accessory gearbox (hereinafter AGB). An appreciable part of the mechanical power can be taken directly from the gas generator (electrical generation, air bleeds for cabin heating . . . ).

In the phase for starting the turboshaft engine, a reversible electric source—also called starter-generator, in an abbreviated form SG, which is fed by a battery—works, in starter mode, as a motor for driving the compressor into rotation until the gas generator works autonomously. Then, in transient phases—takeoff, landing, hovering—or in steady-flight intermediate phases—cruise, low-height search—, the SG source takes kinetic energy from the gas generator so as to work in generator mode and feed the electricity-consuming equipments (controls, air conditioning, pump . . . ) of the on-board electric network.

However, the bleeding of energy from the gas generator to feed the on-board network is disadvantageous in terms of surge margin for the working line, and strongly contributes to limiting the acceleration efficiency of the gas generator when the instantaneous mechanical bleed is not known to the regulation system. So that a sufficient surge margin is maintained, the compressor does not functions any more at an optimal compression ratio and the efficiency deteriorates, in particular the specific fuel consumption increases. This is particularly noticeable in engines that are controlled by gas generator speed variation (dng/dt). Besides, as the acceleration and deceleration requirements are higher and higher, the ensuing speed variation of the free turbine and rotor drive mechanism can have serious consequences.

It is known from patent document FR 2 929 324 how to recover electric energy by coupling the SG source with the free turbine, the SG source being switched to generator mode after the starting phase. This solution requires a new equipment to be added, namely a dedicated switching flip-flop. This addition has an impact in terms of cost and mass, and requires a modification of the engine architecture.

Besides, patent document FR 2 914 697 provides a system for assisting the transient phases by integrating an additional electric motor fed by a battery in order to supply kinetic energy to the gas generator. This solution has the same drawbacks.

DISCLOSURE OF THE INVENTION

The invention aims at reducing the mechanical bleeds from the gas generator, in particular during the transient phases, so as to keep a sufficient surge margin making it possible to provide the acceleration efficiency of the gas generator without further power generation or need for additional sensors or actuators. To this end, the invention provides for increasing the acceleration/deceleration power of the gas generator by modulating the set point for regulating the voltage of the on-board electric network of the aircraft.

More precisely, the object of the present invention is a method for generating electricity applied to an aircraft gas turbine and outputting into an on-board network after the phase for starting the gas turbine. In this method, the voltage of the on-board network is regulated by means of a voltage set point controlled by a step for determining the unloading/loading status of a main electricity-generating source of the on-board network according to the request for power bleed to be supplied to the propulsion of the aircraft, followed by a step for selecting a voltage set point among several levels according to the determination of the unloading/loading status, and by a step for applying the selected set point to a loop for regulating the voltage supplied to the on-board network.

According to particular embodiments:

- a source of electricity remains activated in case of unloading of the main source in order to feed the on-board network, whereas this buffer source can be recharged when the main source is not being unloaded;
- the unloading/loading status can be determined among three statuses, namely unloading, loading and stabilized, according to the speed variation of the gas generator and/or variations in the inclination of the rotor blades, commonly called "collective pitch", in the case of a helicopter;
- an unloading status can be determined when the speed variation of the gas generator is at least equal to an upper bound, taken between +2 and +5% per time unit, and/or when the collective pitch variation is higher than an upper bound by +10 to +30% of the full travel of the collective pitch per time unit in the case of a helicopter;
- a loading status can be determined when the speed variation of the gas generator is lower than or equal to a lower bound taken between −2 and −5% per time unit and/or when the collective pitch variation is lower than an upper bound by +10 to +30% of the full travel of the collective pitch per time unit;
- a stabilization status can be determined when the variation in speed or in the collective pitch are contained between ranges within the upper and lower bounds;
- at least three levels of voltage set point are determined in a step for selecting the set point, in correspondence with the three statuses—unloading/loading/stabilized—determined in the preceding step: a median set-point level is selected when a stabilization status has been determined in the preceding step or when the state of the on-board network is defective; a low set-point level is selected when an unloading status has been determined in the preceding step; and an upper set-point level is selected when a loading status has been determined in the preceding step or when a stabilized status has been determined in order to recharge the buffer source of electricity, in particular further to an acceleration phase during an unloading status;

each voltage set point selection corresponds to definite flight phases: the median voltage set point corresponds to the steady-state intermediate flight phases; the unloading voltage set point, which is substantially lower than the median level set point, corresponds to the accelerations and takeoff of the transient phases; and the loading voltage set point, which is substantially higher than the median level set point, corresponds to the decelerations and landing of the transient phases;

the regulation voltage set point can be adjusted according to data relating to the state of work of the on-board network and/or to the charge of the buffer source;

the state of the on-board network is established by a state of failure or defect of the network, or a state of work or sensitivity of the controls of the consumers and accessories.

The invention also relates to a helicopter turboshaft engine capable of implementing the above method. Such a turboshaft engine includes a gas generator which is capable of driving a rotor mechanism of a propulsion wing and is coupled with a reversible starter-generator capable of forming a source of kinetic energy for the gas generator or a source for supplying electricity to an on-board network. A numerical control unit includes a module for selecting the set point for generating the voltage of the on-board network. This module is capable of selecting a voltage set point from the data supplied by devices for measuring the speed of the gas generator or starter-generator, for measuring the position of the collective pitch of the propulsion wing and for measuring the voltage of the on-board network. The control unit is capable of applying the so selected voltage set point to the on-board network via a regulation loop which is coupled with a regulator.

BRIEF DESCRIPTION OF THE DRAWINGS

Other aspects, characteristics and advantages of the invention will appear in the following non-restrictive description relative to particular embodiments in reference to the accompanying drawings which show respectively.

DETAILED DESCRIPTION

Figure 1:
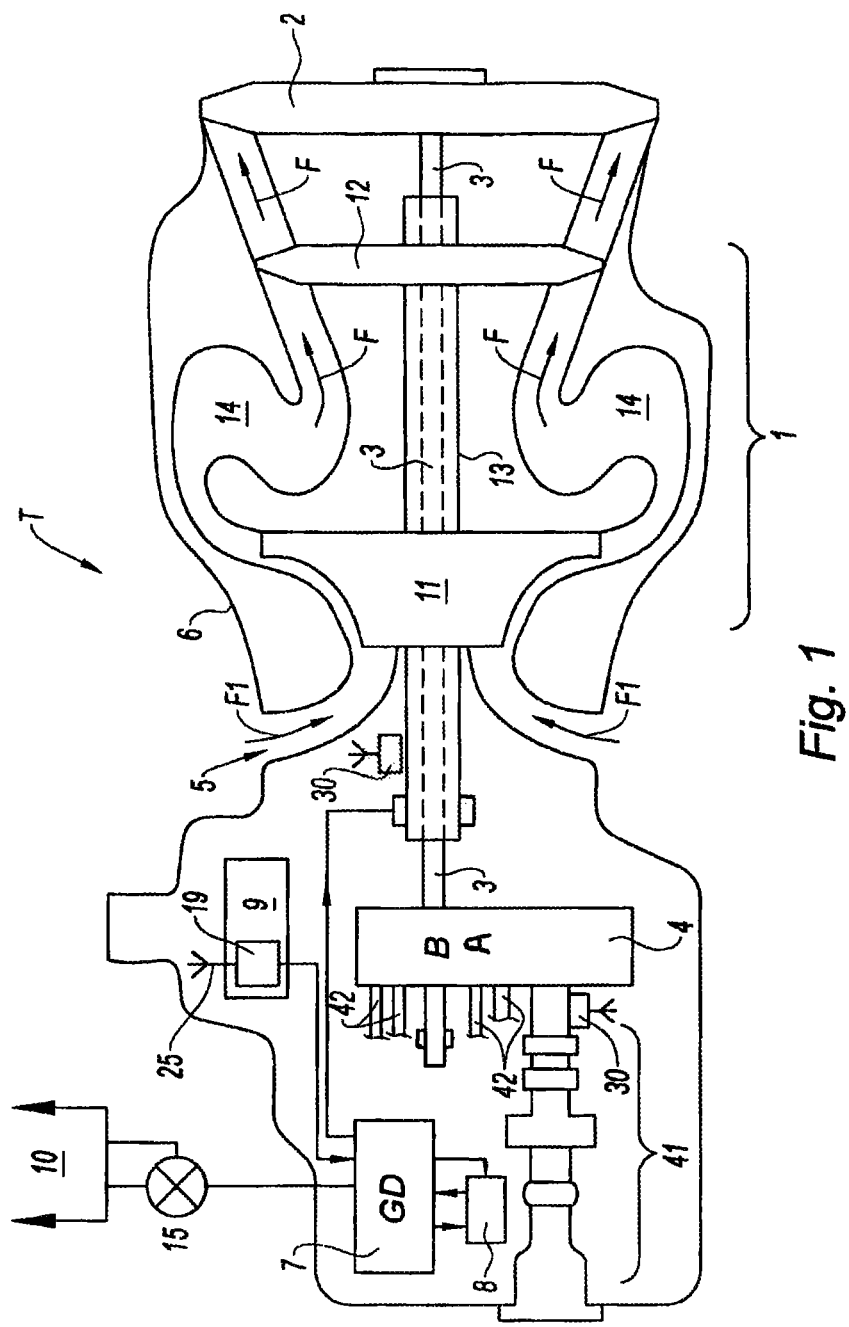
in FIG. 1, a schematic view of a turboshaft engine fitted with the means capable of implementing the method according to the invention.

In reference to the schematic view of FIG. 1, a helicopter turboshaft engine "T" includes, according to an embodiment of the invention, a gas generator 1 and a free turbine 2 which, after a starting phase, is rotatively driven by a gas flow $F_g$ with strong kinetic energy supplied by the gas generator 1.

The free turbine 2 is mounted on a shaft 3 which transmits mechanical energy to a gearbox enabling speed interfacing with an accessory gearbox (AGB). This AGB 4 is capable of transmitting power to the drive mechanism 41 of the propulsion-wing rotor.

As for it, the gas generator 1 drives a set of mechanical (fuel pumps . . . ) and electrical elements (alternators, starters . . . ) as well as—more and more because of the "all electric" trend—the controls of hydraulic (pumps . . . ), mechanical (rotor brake, etc.) or pneumatic equipments (compressors, air conditioning . . . ). The electrical generation occurs then via a reversible motor 7 in generator mode SG. As the SG is reversible, it enables the starting up by driving the gas generator, then the feeding with electric energy once the gas generator runs autonomously, since the SG is mechanically connected, without freewheel, with the gas generator shaft 13 (see the description hereinafter).

The gas generator 1 comprises a compressor 11 and a turbine 12 which are mounted on a rotary shaft 13, as well as a combustion chamber 14 formed between the compressor 11 and the turbine 12. An air flow (arrow F1), which comes from an air inlet 5—formed in a casing 6—and is compressed via the compressor 11, is sent into the chamber 14 to be mixed with the fuel so as to produce, by combustion, the kinetic gas flow $F_g$. This flow F expands while passing through the turbine 12—whereby it rotatively drives the compressor 11 via the rotary shaft 13—then the free turbine 2, whereby it rotatively drives the drive shaft 3.

The transmission of the mechanical energy illustrated in FIG. 1 is the type with front inlet gearbox with a reversing through-going drive shaft 3 which is co-linear with the rotary shaft 13. Alternately, a front inlet gearbox with an outside reversing shaft or a rear inlet gearbox can be implemented without going beyond the scope of the invention.

The turboshaft engine "T" also includes a reversible electric motor 7 capable of working as an electric generator to feed the electric controls 42 of the consumers and accessories of the on-board network 10. This reversible electric motor constitutes a starter-generator source, in an abbreviated form: SG. As an equivalent, it is also possible to use a starter-generator of the type "direct current with brushes" or of the brushless-type, or else an alternator-starter.

The motor 7 is coupled with the shaft 13 in order to rotatively drive the gas generator 1 during the starting phase. Whatever the flight phase may be, the SG remains connected to the gas generator and rotates at a speed which is proportional to that of the gas generator.

The battery for feeding the SG when starting up or an auxiliary battery 8, for example accumulators or a battery with a superconductive storage bobbin, also participates in the electrical generation. So, this battery 8 can supply a sufficiency of electric energy so as not to reduce the voltage of the on-board network 10 during acceleration phases while, as described hereinafter, the reversible motor 7 in generator mode is unloaded. The battery 8 is also appealed to in the starting phase to start the motor 7 in "motor" mode in order to drive the shaft 13 of the gas generator 1.

An accelerated recharging of the battery 8 is performed via the reversible motor 7 in generator mode, during the deceleration phases and, appropriately as explained hereafter, during the steady-state phases.

So as to control the electrical generation of the on-board network 10 according to the various flight phases, a numerical control unit 9, typically called FADEC (after the initials of "Full Authority Digital Engine Controller"), includes a module for selecting 19 a voltage set point to be applied to the on-board network 10. The module 19 receives data supplied by various measuring devices and calculates its time variations in collaboration with the unit 9: measurements of and variations in the speed of the gas generator, $N_G$, and the position of the collective pitch of the rotor, $X_{PC}$, as well as the measurement of the effective voltage $U_N$ of the on-board network 10 so as to make sure of the follow-up of the set point.

The control unit 9 issues a voltage set point for regulating the on-board network according to the flight phases. This set point is transmitted to the regulation loop 15, which is going to control the power delivered by the SG accordingly and, actually, its torque taken from the gas generator.

Figure 2:
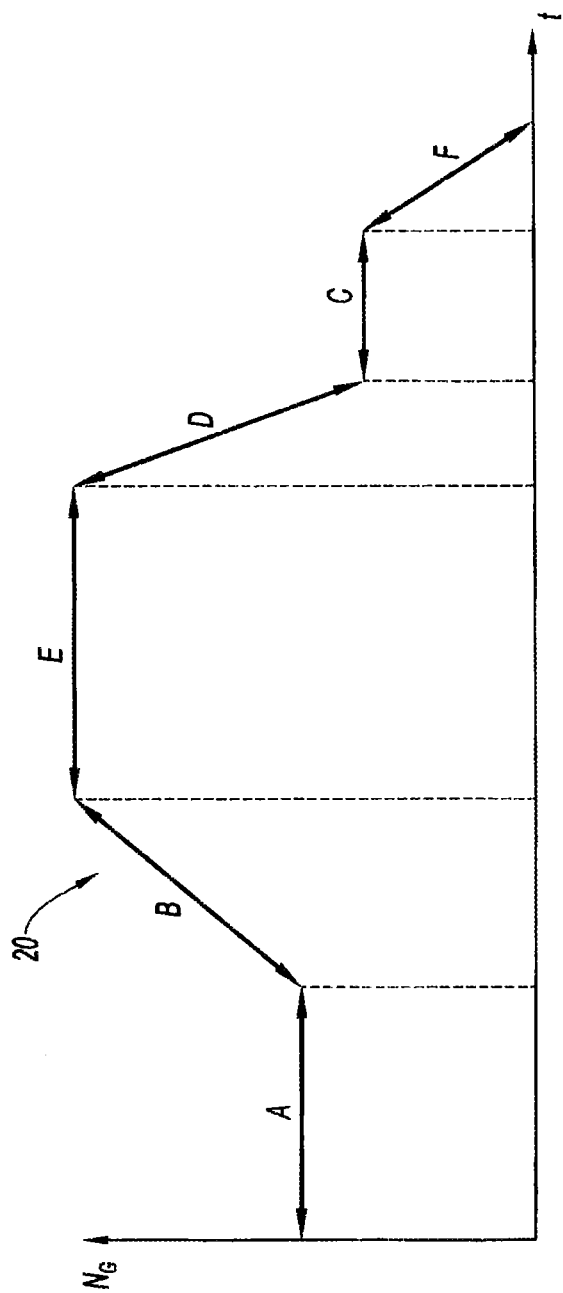
in FIG. 2, an example of a curve of the variation, according to the time, of the speed of a gas generator of a turboshaft engine during various flight phases with a voltage-regulated on-board network according to the invention, and in FIG. 3, an example of a block diagram of means implemented according to the main steps of the method of the invention.

An example of a succession of flight phases of a helicopter is illustrated in FIG. 2 by the flight profile 20, wherein the gas generator speed $N_G$ is expressed according to the time "t".

In the acceleration phases "B", the ratio of bled power dedicated to the reversible motor in generator mode is strongly minimized, or even canceled, by the control unit according to the requirements: the reversible motor is then unloaded in order to supply the power to the propulsion-wing rotor. The requirements of the on-board network are then met by the buffer battery. In the steady-state phases "A", "C" or "E", the electrical requirements of the on-board network are met by the reversible motor.

The battery can thus be recharged in these steady-state phases, in particular for a limited duration after an acceleration phase. In a phase of deceleration "D" or landing "F", the bleed ratio dedicated to the reversible motor in generator mode is maximized and the battery can also be recharged.

Figure 3:
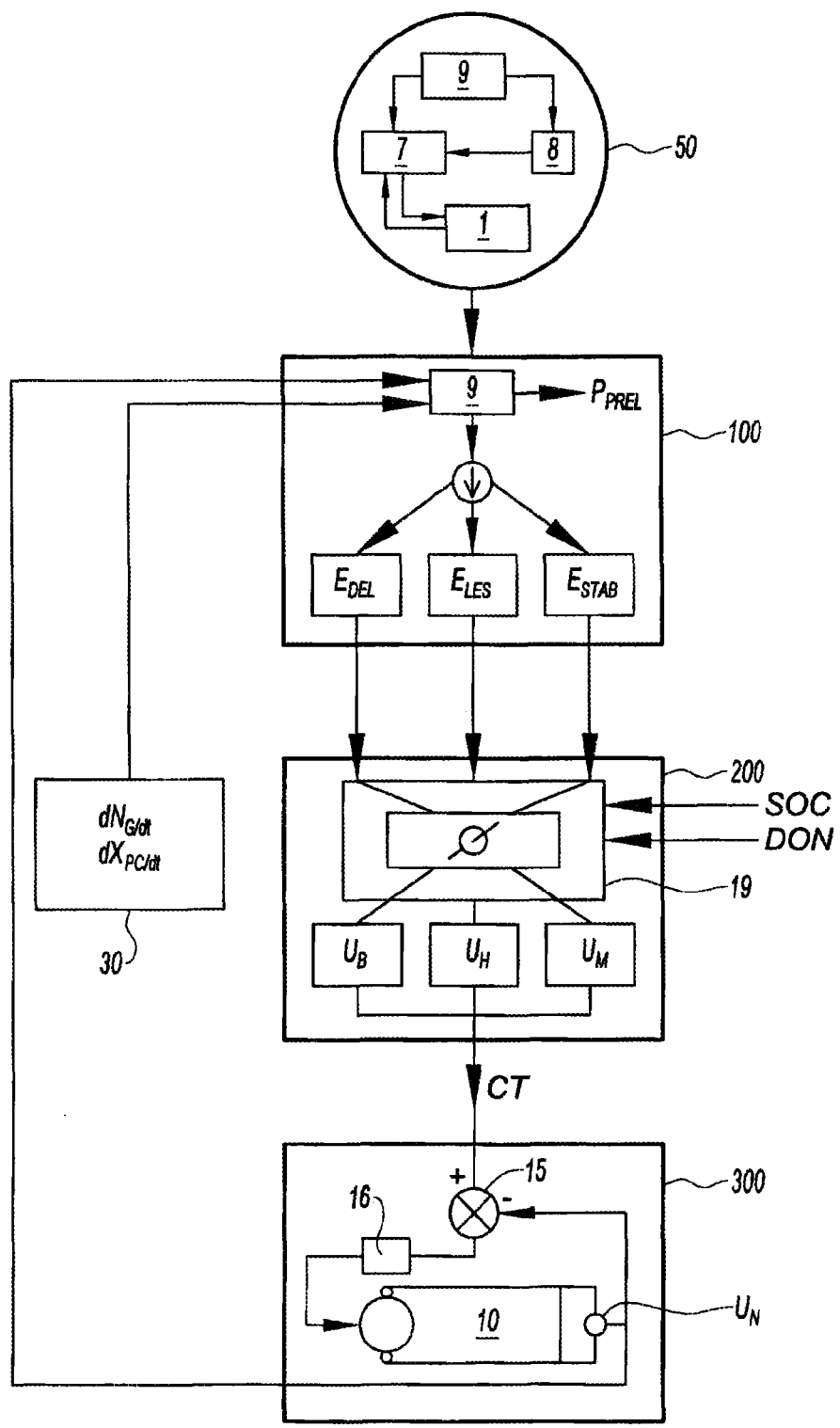

In reference to FIG. 3, here is now the description of a block diagram which illustrates the different steps for activating the electrical generation of the on-board network during the above succession of flight phases "A" to "F". These steps follow a starting phase 50 in which the control unit 9 starts the motor 7 fed by the battery 8. The gas generator 1 is then driven according to a known starting up until the gas generator 1 works in a self-contained way. At the end of this starting phase, the control unit 9 switches the reversible motor 7 to generator mode.

In a first step 100 for selecting the unloading/loading status of the reversible motor 7 in generator mode, the request for power bleed $P_{PREL}$ to be supplied to the propulsion rotor is assessed by the control unit 9 according to the flight conditions.

So, according to an example applied to the above turboshaft engine, the request for bleed $P_{PREL}$ is assessed by the control unit 9 according to the variations in speed $dN_G/dt$ of the gas generator 1 and the collective pitch $dX_{PC}/dt$ from sensors 30, by data transmission to the selection module 19. The transmission can be made by means of any appropriate wiring or by radio waves via adapted transmitting-receiving antennae 25 (FIG. 1).

The step for selecting the status 100 of the motor 7 in generator mode is determined among three statuses: an unloading status $E_{DEL}$ corresponding to the acceleration phases; a loading status $E_{LES}$ corresponding to the deceleration phases; and a stabilized status $E_{STAB}$, corresponding to the steady-state phases; according to reference values of $dN_G/dt$ and $dX_{PC}/dt$. In the example:

the unloading status $E_{DEL}$ is determined when the speed variation $dN_G/dt$ is at least equal to +3% per time unit or when the collective pitch variation $dX_{PC}/dt$ is higher than +20% of the full travel $X_{PC}$ per time unit;

the loading status $E_{LES}$ is determined when the speed variation $dN_G/dt$ is lower than or equal to −3% or when the collective pitch variation $dX_{PC}/dt$ is lower than −20% per time unit;

the stabilized status $E_{STAB}$ is determined when:

$-1\% < dN_G/dt < +1\%$ and $-10\% < dX_{PC}/dt < +10\%$

To each one of these statuses $E_{DEL}$, $E_{LES}$ and $E_{STAB}$ corresponds, in a step for selecting a voltage set point 200, a voltage set-point level CT which is managed by the module 19 among three voltage set point levels $U_B$, $U_H$ and $U_M$ to be applied to the on-board network:

the lower set-point level $U_B$, +24 volts in the example, when an unloading status $E_{DEL}$ has been determined in a phase of acceleration of the gas generator;

the upper set-point level $U_H$, +30 volts in the example, when a loading status $E_{LES}$ has been selected in a phase of deceleration, or when a stabilized status $E_{STAB}$ has been determined—in order to recharge the buffer battery for a limited duration, for example a few seconds, according to its state of charge (SOC) which is monitored by a dedicated device—in particular when the stabilized status follows an acceleration phase;

the median set-point level $U_M$, +28 volts in the example, when a stabilized status $E_{STAB}$ has been determined in the preceding step or when network malfunctions DON (i.e. "Defects On Network") have been detected by dedicated sensors on the on-board network—or by the reading of its supply voltage by the FADEC—and transmitted to the voltage selection step 200: network failure, state of the on-board network, electric controls, sensitive or defective consumers, etc.

The so selected voltage level CT is applied, in an application step 300, to the input of a loop for regulating 15 the voltage applied across the on-board network 10, the loop being coupled with a regulator 16.

The effective voltage $U_N$ of the on-board network 10, the one which was brought into the loop 15 so that it is compared with the voltage set point CT, is measured and transmitted to the control unit 9. In case an unloading status $E_{DEL}$ of the main source 7 has been determined, the voltage is supplied by the battery 8: the control unit 9 verifies then whether this voltage is sufficient for the network and, in case of insufficiency, whether a loading of the main source is possible, at least for a short duration.

The invention is not limited by the described and represented examples. It is for example possible to define more than three voltage set point levels for the on-board network by differentiating sub-levels, corresponding to various acceleration levels of the power generator, or other transient phases (hovering flight, low-altitude search over the sea, etc.). Besides, it is possible to use several main reversible sources and/or several secondary sources of electricity.

The invention claimed is:

1. A method for controlling generation of electricity applied to an aircraft gas turbine and output into an on-board network, comprising:
    after a phase for starting the gas turbine, regulating a voltage of the on-board network by a voltage set point controlled by determining an unloading/loading status of a main electricity-generating source of the on-board network according to a request for power bleed to be supplied to propulsion of the aircraft;
    then, by selecting a voltage set point among plural levels according to a determination of the unloading/loading status; and
    applying the selected set point to a loop for regulating voltage supplied to the on-board network.

2. A method for generating electricity according to claim 1, in which a source of electricity is activated in a case of unloading of the main source to feed the on-board network, whereas a buffer source can be recharged when the main source is not being unloaded.

3. A method for generating electricity according to claim 1, in which the unloading/loading status is determined among three statuses, of unloading, loading, and stabilized, according to a speed variation of the gas generator, and/or variations in a collective pitch of inclination of rotor blades in a case of a helicopter.

4. A method for generating electricity according to claim 3, in which the unloading status is determined when the speed variation of the gas generator is at least equal to an upper bound, taken between +2 and +5% per time unit, and/or when the collective pitch variation is higher than an upper bound by +10 to +30% of a full travel per time unit in the case of a helicopter.

5. A method for generating electricity according to claim 3, in which the loading status is determined when the speed variation of the gas generator is lower than or equal to a lower bound, taken between 2 and 5%, and/or when a collective pitch variation is lower than an upper bound by +10 to +30% of a full travel of the collective pitch per time unit.

6. A method for generating electricity according to claim 3, in which the stabilization status is determined when the speed variation or the collective pitch are contained between ranges within upper and lower bounds.

7. A method for generating electricity according to claim 1, in which at least three levels of the voltage set point are determined in the set point selection, in relation with three unloading/loading/stabilized statuses that have been determined of:
a median set-point level is selected when a stabilization status has been determined in or when a state of the on-board network is defective;
a lower set-point level is selected when an unloading status has been determined; and
an upper set-point level is selected when a loading status has been determined or when a stabilized status has been determined to recharge the buffer source of electricity, or further to an acceleration phase of the gas generator during an unloading status.

8. A method for generating electricity according to claim 7, in which the voltage set point applied to the on-board network is adjusted according to a state of work of the on-board network and/or a state of charge of the buffer source.

9. A method for generating electricity according to claim 8, in which the state of the on-board network is established according to a state of failure or defect of the network, or a state of work or sensitivity of controls of consumers and accessories.

10. An electrical generation system in a helicopter capable of implementing the method according to claim 1, comprising:
a reversible starter-generator;
a gas generator capable of driving a mechanism of a propulsion-wing rotor and coupled with the starter-generator which is capable of supplying it with the electric energy source;
devices for measuring a speed of the gas generator or a starter-generator;
an on-board network that can be fed by the starter-generator; and
a numerical control unit;
in which the numerical control unit includes a module for selecting the voltage set point of the on-board network and a regulation loop coupled with a regulator, the module capable of selecting a voltage set point from the data supplied by the devices for measuring a speed, for measuring a position of a collective pitch of the propulsion wing and for measuring a voltage of the on-board network, and the control unit is capable of applying the selected voltage set point to the on-board network via the regulation loop.

11. An electrical generation system according to claim 10, in which a buffer battery is capable of substituting for the starter-generator to form electrical generation for the on-board network at least during unloading statuses of the starter-generator.

12. An electrical generation system according to the claim 11, in which a device is capable of monitoring a state of charge of the battery and sensors are capable of detecting malfunctions of the network, or of electric controls.

* * * * *